US012670251B2

(12) United States Patent
Chen et al.

(10) Patent No.: US 12,670,251 B2
(45) Date of Patent: Jun. 30, 2026

(54) STRUCTURING IPV6 ADDRESSES INTO BIT FIELDS TO EMBED LANGUAGE LOCALIZATION AND SERVICES

(71) Applicant: Palo Alto Networks, Inc., Santa Clara, CA (US)

(72) Inventors: Jia Chen, Palo Alto, CA (US); Rohit Mendiratta, Dublin, CA (US); Jining Tian, Saratoga, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 19 days.

(21) Appl. No.: 18/680,718

(22) Filed: May 31, 2024

(65) Prior Publication Data

US 2025/0371147 A1 Dec. 4, 2025

(51) Int. Cl.
*G06F 21/56* (2013.01)

(52) U.S. Cl.
CPC ........ *G06F 21/56* (2013.01); *G06F 2221/034* (2013.01)

(58) Field of Classification Search
None
See application file for complete search history.

(56) References Cited

U.S. PATENT DOCUMENTS

| | | | | |
|---|---|---|---|---|
| 11,005,954 B2 * | 5/2021 | Wang | ...................... | H04L 12/18 |
| 2005/0272421 A1 * | 12/2005 | Vare | ...................... | H04W 4/023 |
| | | | | 455/432.1 |
| 2013/0305044 A1 * | 11/2013 | Gutt | ...................... | H04L 63/126 |
| | | | | 713/160 |
| 2013/0315102 A1 * | 11/2013 | Kahng | ................... | H04W 4/02 |
| | | | | 370/254 |
| 2016/0094433 A1 * | 3/2016 | Friedel | ............... | H04L 47/2408 |
| | | | | 709/240 |
| 2016/0094669 A1 * | 3/2016 | Karampurwala | ....... | H04W 4/02 |
| | | | | 370/328 |
| 2020/0084303 A1 * | 3/2020 | Liu | ......................... | H04L 67/52 |
| 2021/0176206 A1 * | 6/2021 | Sayko | ................. | H04L 61/4511 |
| 2023/0053788 A1 * | 2/2023 | Peng | ...................... | H04L 69/22 |

OTHER PUBLICATIONS

Dan et al., IP Geolocation through Reverse DNS, IP Geolocation through Reverse DNS, ACM Transactions on Internet Technology, vol. 22, No. 1, Article 17. Publication date: Oct. 2021.
Paul Braeuning, Selection of Best Server to Work on a Network Request of a Client Based on its Physical and Virtual Location and Distance to the Server, Bachelor Thesis, Oct. 18, 2023.
William Stallings, Software-Defined Networks and OpenFlow, The Internet Protocol Journal, vol. 16, No. 1, Mar. 2013.

* cited by examiner

*Primary Examiner* — Christopher C Harris
(74) *Attorney, Agent, or Firm* — Van Pelt, Yi & James LLP

(57) ABSTRACT

Techniques for structuring IP version 6 (IPv6) addresses into bit fields to embed language localization and services information (e.g., and/or other attributes/information) are disclosed. In some embodiments, a system/process/computer program product for structuring IPv6 addresses into bit fields to embed language localization and services information includes allocating a configurable portion of an IP version 6 (IPv6) address for a subnet, wherein the subnet includes information that is associated with a geographical location (geolocation); and determining an attribute for a new session based on the subnet.

26 Claims, 12 Drawing Sheets

Fig 3, Cont.
- Routing prefix (/64) and instance together make up a GW subnet (/96)
- IP pool manager allocates multiple subnets to GW's data interface, one subnet for each geolocation

| | Geolocation prefix (/44) | Routing prefix (/64) | GW subnet prefix (/96) | Client public IPv6 (assigned) (/128) |
|---|---|---|---|---|
| Munich, Germany | 2026:f4c0:2120::/44 | 2026:f4c0:2120:0101::/64 | 2026:f4c0:2120:0101:8000:0006::/96 | 2026:f4c0:2120:0101:8000:0006:70db:38/128 |
| Marseille, France | 2026:f4c0:2020::/44 | 2026:f4c0:2020:0101::/64 | 2026:f4c0:2020:0101:8000:0006::/96 | 2026:fc4c:2020:0101:8000:0006:71db: 22/128 |
| Frankfurt, Germany | 2026:f4c0:20a0::/44 | 2026:f4c0:20a0:0101::/64 | 2026:f4c0:20a0:0101:8000:0006::/96 | 2026:fc4c:20a0:0101:8000:0006:7737:55/128 |

FIG. 4

| Cases | GW subnet | Instance | Check Sum | Host |
|-------|-----------|----------|-----------|------|
| Case 1 | /96 | Bits [65-96], 32 bits | Bits [97-112], 16 bits | Bits [113-128], 16 bits |
| Case 2 | /88 | Bits [65-88], 24 bits | Bits [89-104], 16 bits | Bits [105 -128], 24 bits |
| Case 3 | /80 | Bits [65-80], 16 bits | Bits [81- 96], 16 bits | Bits [97-128], 32 bits |

FIG. 7

1102   Allocate a configurable portion of an IP version 6 (IPv6) address for a subnet, wherein the configurable subnet includes information that is associated with a geographical location (geolocation).

1104   Determine an attribute for a new session based on the configurable subnet.

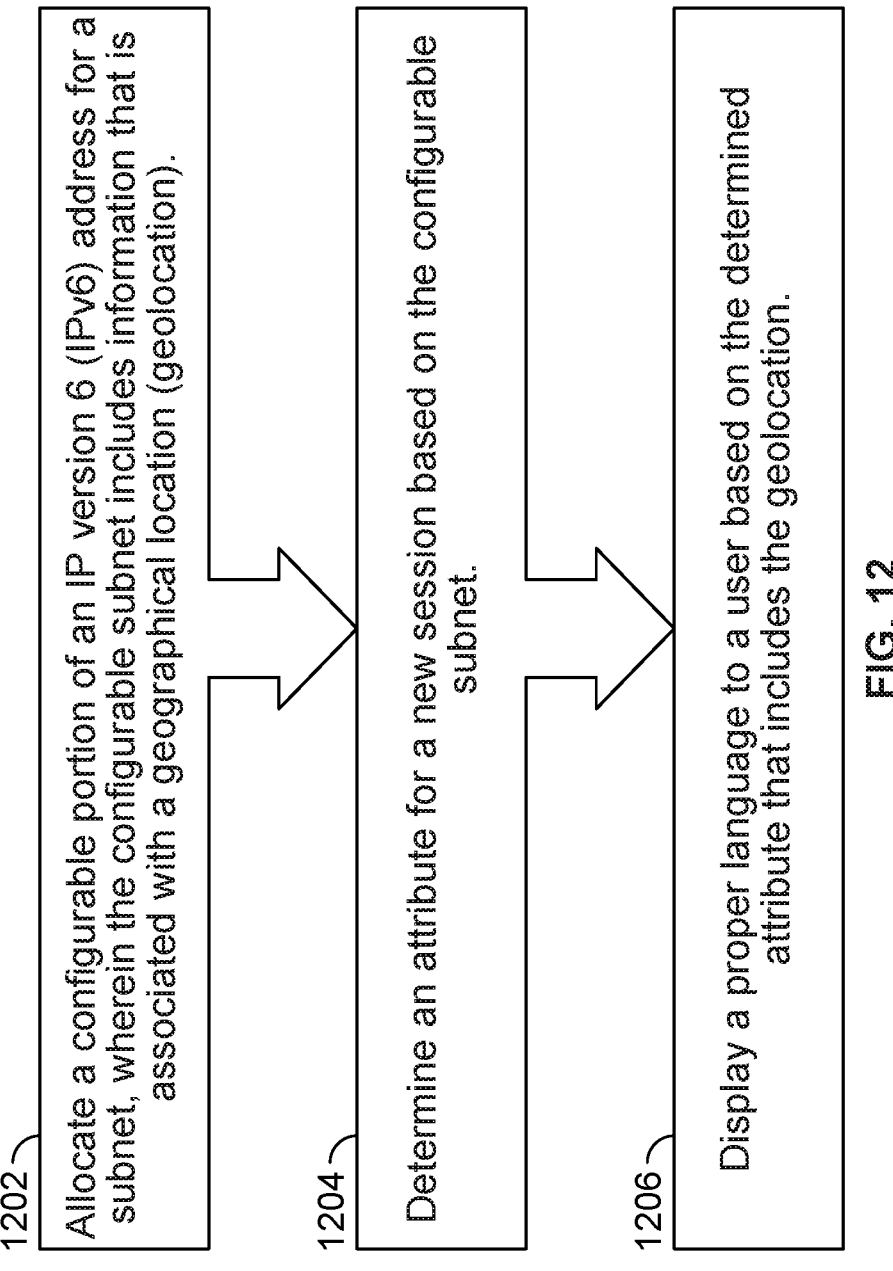

1202 Allocate a configurable portion of an IP version 6 (IPv6) address for a subnet, wherein the configurable subnet includes information that is associated with a geographical location (geolocation).

1204 Determine an attribute for a new session based on the configurable subnet.

1206 Display a proper language to a user based on the determined attribute that includes the geolocation.

FIG. 12

STRUCTURING IPV6 ADDRESSES INTO BIT FIELDS TO EMBED LANGUAGE LOCALIZATION AND SERVICES

BACKGROUND OF THE INVENTION

Malware is a general term commonly used to refer to malicious software (e.g., including a variety of hostile, intrusive, and/or otherwise unwanted software). Malware can be in the form of code, scripts, active content, and/or other software. Example uses of malware include disrupting computer and/or network operations, stealing proprietary information (e.g., confidential information, such as identity, financial, and/or intellectual property related information), and/or gaining access to private/proprietary computer systems and/or computer networks. Unfortunately, as techniques are developed to help detect and mitigate malware, nefarious authors find ways to circumvent such efforts. Accordingly, there is an ongoing need for improvements to techniques for identifying and mitigating malware.

BRIEF DESCRIPTION OF THE DRAWINGS

Various embodiments of the invention are disclosed in the following detailed description and the accompanying drawings.

FIG. 4 illustrates a table view of public IPv6 allocation for a client per geolocation in accordance with some embodiments.

FIG. 7 illustrates a table view of bits between 64 and 128, which can have variations depending on instance bits, in accordance with some embodiments.

FIG. 12 is a flow diagram for structuring IPv6 addresses into bit fields to embed language localization and services information (e.g., and/or other attributes/information) in accordance with some embodiments.

DETAILED DESCRIPTION

Figure 1:
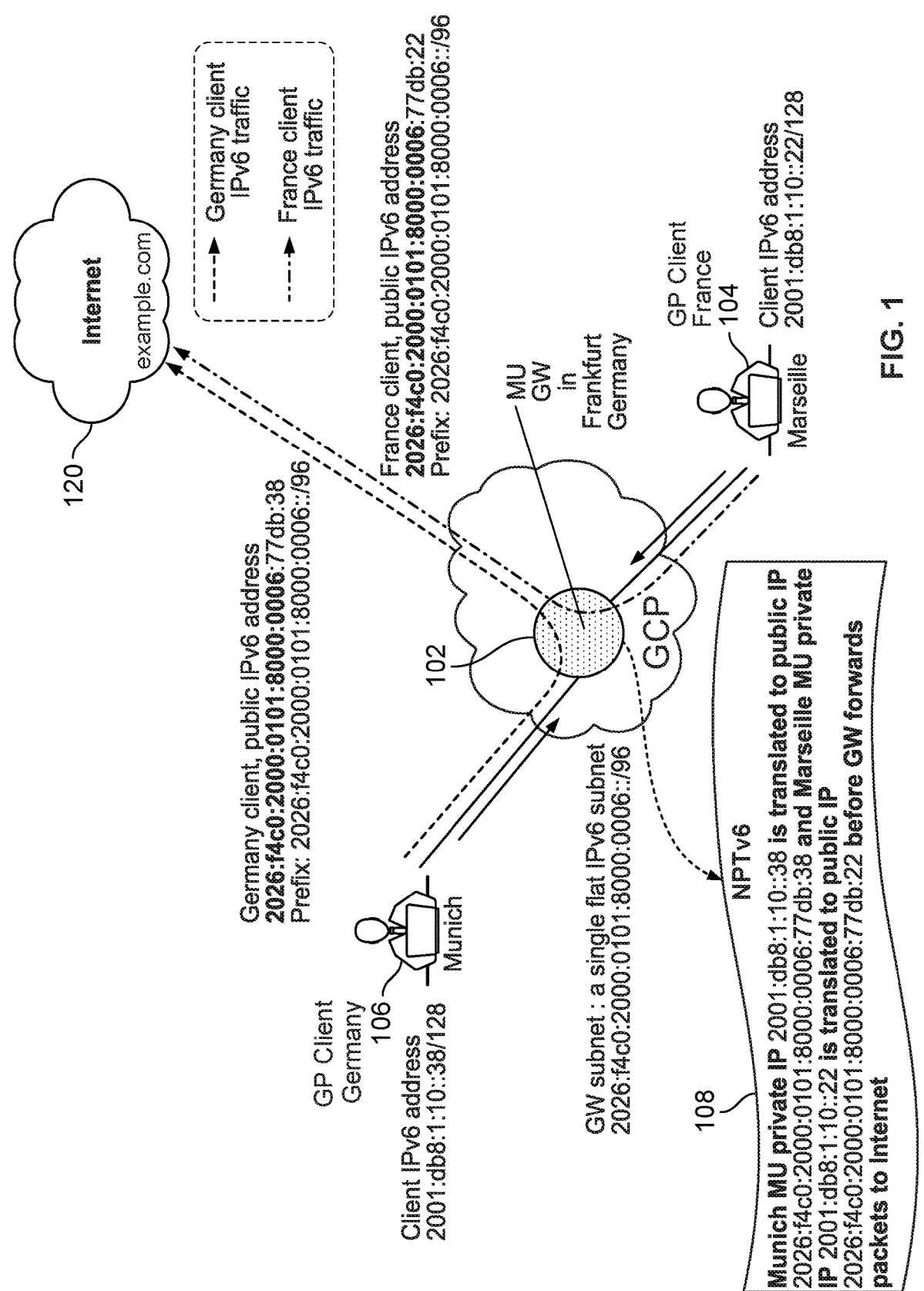
FIG. 1 illustrates an example of an existing cloud security solution using IP version 6 (IPv6) addressing for which language localization and tenant information is not available.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A firewall generally protects networks from unauthorized access while permitting authorized communications to pass through the firewall. A firewall is typically a device, a set of devices, or software executed on a device that provides a firewall function for network access. For example, a firewall can be integrated into operating systems of devices (e.g., computers, smart phones, or other types of network communication capable devices). A firewall can also be integrated into or executed as one or more software applications on various types of devices, such as computer servers, gateways, network/routing devices (e.g., network routers), and data appliances (e.g., security appliances or other types of special purpose devices), and in various implementations, certain operations can be implemented in special purpose hardware, such as an ASIC or FPGA.

Firewalls typically deny or permit network transmission based on a set of rules. These sets of rules are often referred to as policies (e.g., network policies or network security policies). For example, a firewall can filter inbound traffic by applying a set of rules or policies to prevent unwanted outside traffic from reaching protected devices. A firewall can also filter outbound traffic by applying a set of rules or policies (e.g., allow, block, monitor, notify or log, and/or other actions can be specified in firewall rules or firewall policies, which can be triggered based on various criteria, such as are described herein). A firewall can also filter local network (e.g., intranet) traffic by similarly applying a set of rules or policies.

Security devices (e.g., security appliances, security gateways, security services, and/or other security devices) can include various security functions (e.g., firewall, anti-malware, intrusion prevention/detection, Data Loss Prevention (DLP), and/or other security functions), networking functions (e.g., routing, Quality of Service (QoS), workload balancing of network related resources, and/or other networking functions), and/or other functions. For example, routing functions can be based on source information (e.g., IP address and port), destination information (e.g., IP address and port), and protocol information.

A basic packet filtering firewall filters network communication traffic by inspecting individual packets transmitted over a network (e.g., packet filtering firewalls or first generation firewalls, which are stateless packet filtering firewalls). Stateless packet filtering firewalls typically inspect the individual packets themselves and apply rules based on the inspected packets (e.g., using a combination of a packet's source and destination address information, protocol information, and a port number).

Application firewalls can also perform application layer filtering (e.g., application layer filtering firewalls or second generation firewalls, which work on the application level of the TCP/IP stack). Application layer filtering firewalls or application firewalls can generally identify certain applications and protocols (e.g., web browsing using HyperText Transfer Protocol (HTTP), a Domain Name System (DNS) request, a file transfer using File Transfer Protocol (FTP), and various other types of applications and other protocols, such as Telnet, DHCP, TCP, UDP, and TFTP (GSS)). For example, application firewalls can block unauthorized protocols that attempt to communicate over a standard port (e.g., an unauthorized/out of policy protocol attempting to sneak through by using a non-standard port for that protocol can generally be identified using application firewalls).

Stateful firewalls can also perform state-based packet inspection in which each packet is examined within the context of a series of packets associated with that network transmission's flow of packets. This firewall technique is generally referred to as a stateful packet inspection as it maintains records of all connections passing through the firewall and is able to determine whether a packet is the start of a new connection, a part of an existing connection, or is an invalid packet. For example, the state of a connection can itself be one of the criteria that triggers a rule within a policy.

Advanced or next generation firewalls can perform stateless and stateful packet filtering and application layer filtering as discussed above. Next generation firewalls can also perform additional firewall techniques. For example, certain newer firewalls sometimes referred to as advanced or next generation firewalls can also identify users and content (e.g., next generation firewalls). In particular, certain next generation firewalls are expanding the list of applications that these firewalls can automatically identify to thousands of applications. Examples of such next generation firewalls are commercially available from Palo Alto Networks, Inc. (e.g., Palo Alto Networks' PA Series firewalls). For example, Palo Alto Networks' next generation firewalls enable enterprises to identify and control applications, users, and content—not just ports, IP addresses, and packets—using various identification technologies, such as the following: APP-ID for accurate application identification, User-ID for user identification (e.g., by user or user group), and Content-ID for real-time content scanning (e.g., controlling web surfing and limiting data and file transfers). These identification technologies allow enterprises to securely enable application usage using business-relevant concepts, instead of following the traditional approach offered by traditional port-blocking firewalls. Also, special purpose hardware for next generation firewalls (implemented, for example, as dedicated appliances) generally provide higher performance levels for application inspection than software executed on general purpose hardware (e.g., such as security appliances provided by Palo Alto Networks, Inc., which use dedicated, function specific processing that is tightly integrated with a single-pass software engine to maximize network throughput while minimizing latency).

Advanced or next generation firewalls can also be implemented using virtualized firewalls. Examples of such next generation firewalls are commercially available from Palo Alto Networks, Inc. (e.g., Palo Alto Networks' VM Series firewalls, which support various commercial virtualized environments, including, for example, VMware® ESXi™ and NSX™, Citrix® Netscaler SDX™, KVM/OpenStack (Centos/RHEL, Ubuntu®), and Amazon Web Services (AWS)) as well as CN Series container next generation firewalls. For example, virtualized firewalls can support similar or the exact same next-generation firewall and advanced threat prevention features available in physical form factor appliances, allowing enterprises to safely enable applications flowing into, and across their private, public, and hybrid cloud computing environments. Automation features such as VM monitoring, dynamic address groups, and a REST-based API allow enterprises to proactively monitor VM changes dynamically feeding that context into security policies, thereby eliminating the policy lag that may occur when VMs change.

Overview of Techniques for Structuring IPv6 Addresses into Bit Fields to Embed Language Localization and Services Information An IP version 6 (IPv6) address in data traffic is typically a flat 128 bits. When the data traffic is examined (e.g., at a networking device, such as a gateway), it cannot be determined where the geolocation of a client/user is, which cloud this traffic comes from, which tenant this traffic belongs to, what service this is about, and what language the web page should display.

As such, this presents technical challenges to Internet Service Providers (ISPs), networking solutions including security solutions, as well as cloud service providers.

Thus, new and improved solutions are needed to address these technical challenges associated with IPv6 addresses in data traffic, such as for language localization and services information, in addition to be used for routing the traffic.

Accordingly, various techniques are disclosed for structuring IPv6 addresses into bit fields to embed language localization and services information (e.g., and/or other attributes/information).

In some embodiments, a system/process/computer program product for structuring IPv6 addresses into bit fields to embed language localization and services information includes allocating a configurable portion of an IP version 6 (IPv6) address for a subnet, wherein the subnet includes information that is associated with a geographical location (geolocation); and determining an attribute for a new session based on the subnet.

For example, the configurable portion of an IPv6 address further includes tenant information.

As another example, the configurable portion of an IPv6 address further includes service type information to self-identify associated network traffic with the service type including one or more of the following: mobile user (MU), remote node (RN), proxy, and/or another service type.

As yet another example, the subnet can be of a variable size that is used for configurable attribute information.

In some embodiments, a system/process/computer program product for structuring IPv6 addresses into bit fields to embed language localization and services information further includes displaying a proper language to a user based on the determined attribute that includes the geolocation.

For example, determining the attribute for the new session based on the subnet can be applied to enable a web site to display a proper language based on the IPv6 address without requiring an extra header to support language translation.

As another example, determining the attribute for the new session based on the subnet can be applied to enable a service provider to tailor content based on a user's geolocation.

As yet another example, determining the attribute for the new session based on the subnet can be applied to enable a service provider to tailor content based on a user's geolocation.

In some embodiments, a system/process/computer program product for structuring IPv6 addresses into bit fields to embed language localization and services information further includes determining the attribute for the new session based on the subnet to enable associated network traffic to self-identify its originating cloud.

In some embodiments, a system/process/computer program product for structuring IPv6 addresses into bit fields to embed language localization and services information further includes determining the attribute for the new session based on the subnet to enable associated network traffic to self-identify its originating Secure Access Service Edge (SASE).

For example, the disclosed techniques for structuring IPv6 addresses into bit fields to embed language localization and services information (e.g., and/or other attributes/information) can be applied (in addition to being used for typical IPv6 routing) so that a web can display the proper language based on the user location by using the edge location bits without using extra header.

In some embodiments, a system/process/computer program product for structuring IPv6 addresses into bit fields to embed language localization and services information further includes enhancing a user identification (User-ID) with richer user information.

In some embodiments, a system/process/computer program product for structuring IPv6 addresses into bit fields to embed language localization and services information further includes assisting global tracking using the configurable portion of the IPv6 address.

In some embodiments, a system/process/computer program product for structuring IPv6 addresses into bit fields to embed language localization and services information further includes maintaining seamless integrity of global routing using the configurable portion of the IPv6 address.

For example, the disclosed techniques for structuring IPv6 addresses into bit fields to embed language localization and services information (e.g., and/or other attributes/information) can be applied so that traffic can self-identify its originating cloud.

As another example, the disclosed techniques for structuring IPv6 addresses into bit fields to embed language localization and services information (e.g., and/or other attributes/information) can be applied so that traffic can self-identify its originating edge location and in turn, the web browser can display proper language of a web page to the user.

As yet another example, the disclosed techniques for structuring IPv6 addresses into bit fields to embed language localization and services information (e.g., and/or other attributes/information) can be applied so that traffic can self-identify its originating tenant.

As a final example, the disclosed techniques for structuring IPv6 addresses into bit fields to embed language localization and services information (e.g., and/or other attributes/information) can be applied so that traffic can self-identify its service type (e.g., mobile user (MU), remote node (RN), proxy, etc.).

These and other aspects of techniques for structuring IPv6 addresses into bit fields to embed language localization and services information (e.g., and/or other attributes/information) will be further described below with respect to various system embodiments.

Example System Embodiments for Stucturing IPv6 Addresses into Bit Fields to Embed Language Localization and Services Information FIG. 1 illustrates an example of an existing cloud security solution using IP version 6 (IPv6) addressing for which language localization and tenant information is not available.

Referring to FIG. 1, as shown in this example diagram, we have mobile users (MU) in both France and Germany as shown at 104 and 106, respectively, that connect to a MU gateway (GW) 102 located in Frankfurt, Germany. In this example scenario, an IP pool manager assigns a single public IPv6 subnet (2026:f4c0:2000:0101:8000:0006::/96) to the GW data plane interface as shown in FIG. 1.

For existing IPv6 solutions (e.g., as typically implemented by cloud security service providers, such as Prisma Access, which is commercially available from Palo Alto Networks, Inc. (PA), headquartered in Santa Clara, CA, and Internet Service Providers (ISPs)), the MU clients send data packets to an Internet server (e.g., example.com) as shown at 120 via MU GW 102. The MU GW uses the Network Prefix Translation version 6 (NPTv6) protocol to translate a private IPv6 source address (e.g., 2001:db8:1:10::38 from Munich client 106, or 2001:db8:1:10::22 from Marseille client 104) 108, as shown in FIG. 1 to a public IPv6 address by using the MU GW's IP subnet 2026:f4c0:2000:0101:8000:0006::/96 before forwarding the packet to the Internet 120.

However, this results in various technical problems as will now be described with respect to FIG. 1. The MU GW is allocated a single flat IPv6 subnet. This results in giving the source address of each of the packets the same MU GW's IPv6 subnet. As such, a web site (e.g., or other service) is not aware of the client's real physical location, which may as a result display, for example, the wrong language for a client, such as displaying German language for clients that are actually located in France.

In addition, the cloud service provider (e.g., Google Cloud Platform (GCP), Amazon Web Services (AWS), and/or other cloud service providers) cannot be determined based on examination of the IP address (i.e., the IPv6 address).

Similarly, the tenant (e.g., Boing), or service type (e.g., MU service) cannot be determined based on examination of the IP address (i.e., the IPv6 address).

Thus, new and improved solutions are needed to address these technical challenges associated with IPv6 addresses in data traffic, such as for language localization and services information, in addition to be used for routing the traffic.

Accordingly, various techniques are disclosed for structuring IPv6 addresses into bit fields to embed language localization and services information (e.g., and/or other attributes/information) as will now be further described below.

Figure 2:
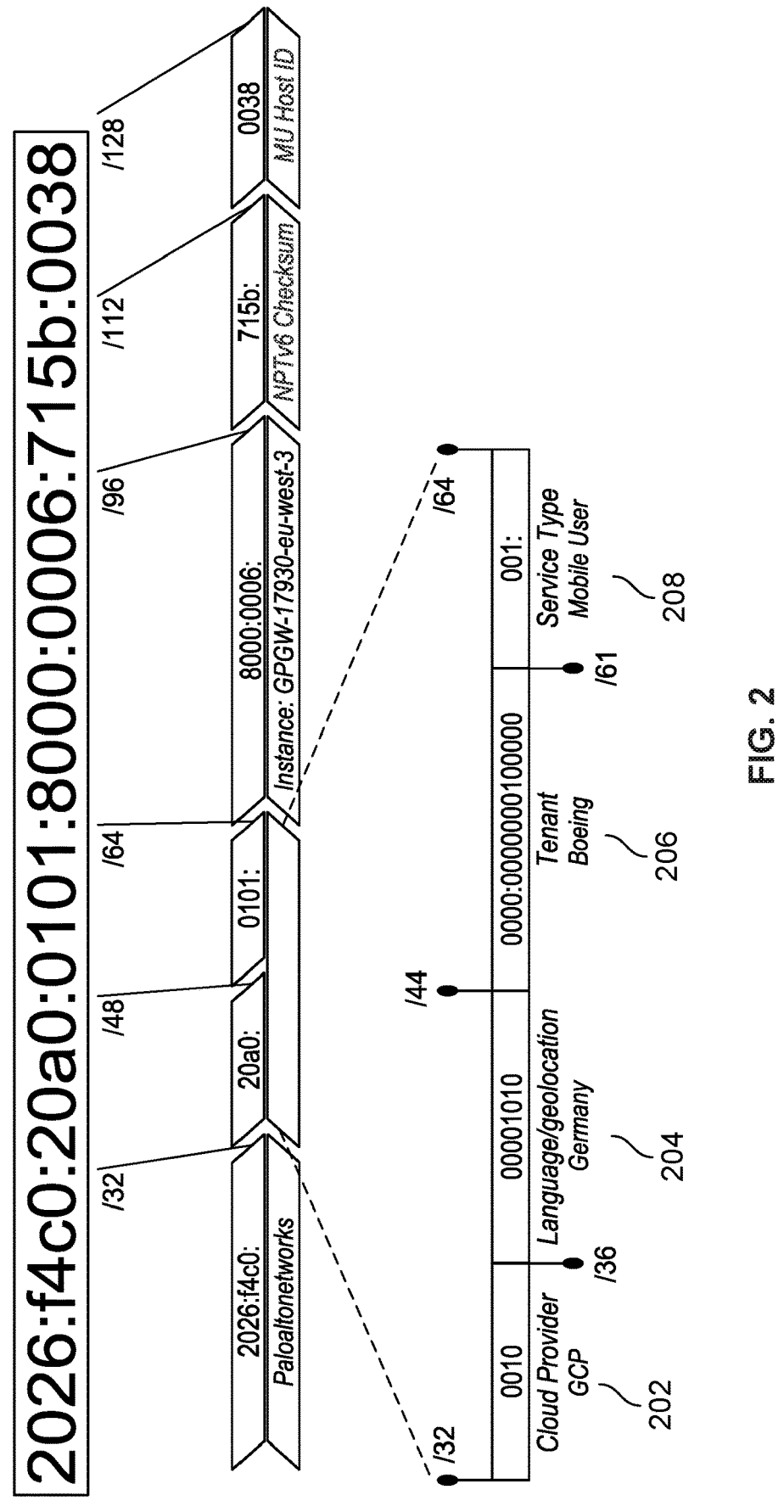
FIG. 2 illustrates an embodiment for structuring IPv6 addresses into bit fields to embed language localization and services information (e.g., and/or other attributes/information).

FIG. 2 illustrates an embodiment for structuring IPv6 addresses into bit fields to embed language localization and services information (e.g., and/or other attributes/information).

Generally, the addition of structure and intelligence to the otherwise flat/standard IPv6 addressing scheme is disclosed. For example, additional/extra information, such as cloud provider, geographical (geo) location (geolocation), tenant information, and/or service type, is embedded in the IPv6 address and carried with each data packet to solve the above-described technical problems, such as similarly described above with respect to FIG. 1.

An IPv6 address is basically composed of two halves: (1) the most significant 64 bits (e.g., the first half) is a network prefix and is used for routing the packet; and (1) the second half of 64 bits is used to identify a host's network interface.

As an ISP, PA has been allocated (e.g., purchased) a/32 CIDR from ARIN (e.g., 2026:F4C0::/32) in accordance with some embodiments. More specifically, the bits between 32 to 64 is subdivided, such that it can carry intelligent information (e.g., including signatures of a cloud provider, geolocation, tenant, and service type, such as shown in FIG. 2), without interfering with the integrity of routing based on the IPv6 addresses, such as will be further described below.

Referring to FIG. 2, a detailed layout and bit boundary between bits 32 and 64 is provided in which the bits between 32 and 64 are subdivided as provided below.

Cloud Provider: 4 bits, bits [33-36], to identify a cloud provider/vendor (e.g., GCP, AWS, Microsoft Azure, etc.), as shown at 202.

Geolocation or Language Localization: 8 bits, bits [37-44], CIDR/prefix/44 can be stored in a geo data store (e.g., a geo database) to indicate an MU edge location, as shown at 204. For example, these bit fields can be used to display the preferred language by a web site/page (e.g., assume that both France mobile users and Germany mobile users are connected to Frankfurt GW, such as shown in FIG. 1, with different edge location indications from the IPv6 address, the web site/page (for example.com) can display the proper language for each of these mobile users, in which a different/44 is registered to a different country (e.g., via MaxMind)).

Tenant: 17 bits, bits [45-61], to indicate tenants (e.g., which identify the PA customers or other security provider customers), as shown at 206.

Service Type: 3 bits, bits [62-64], to indicate services (e.g., MU, RN, proxy, and/or other services), as shown at 208, As also shown in FIG. 2, the 32 bits between bits 64 and 96 are used to identify VM instances in the cloud (e.g., MU instance of "GPGW_17930_eu-west-3").

As also shown in FIG. 2, the 32 bits between bits 96 and 128 are reserved for the NPTv6 protocol for source network address translation (NAT) (e.g., bits 96 to 112 for the NPTv6 checksum and bits 112 to 128 for the MU Host ID).

Figure 3:
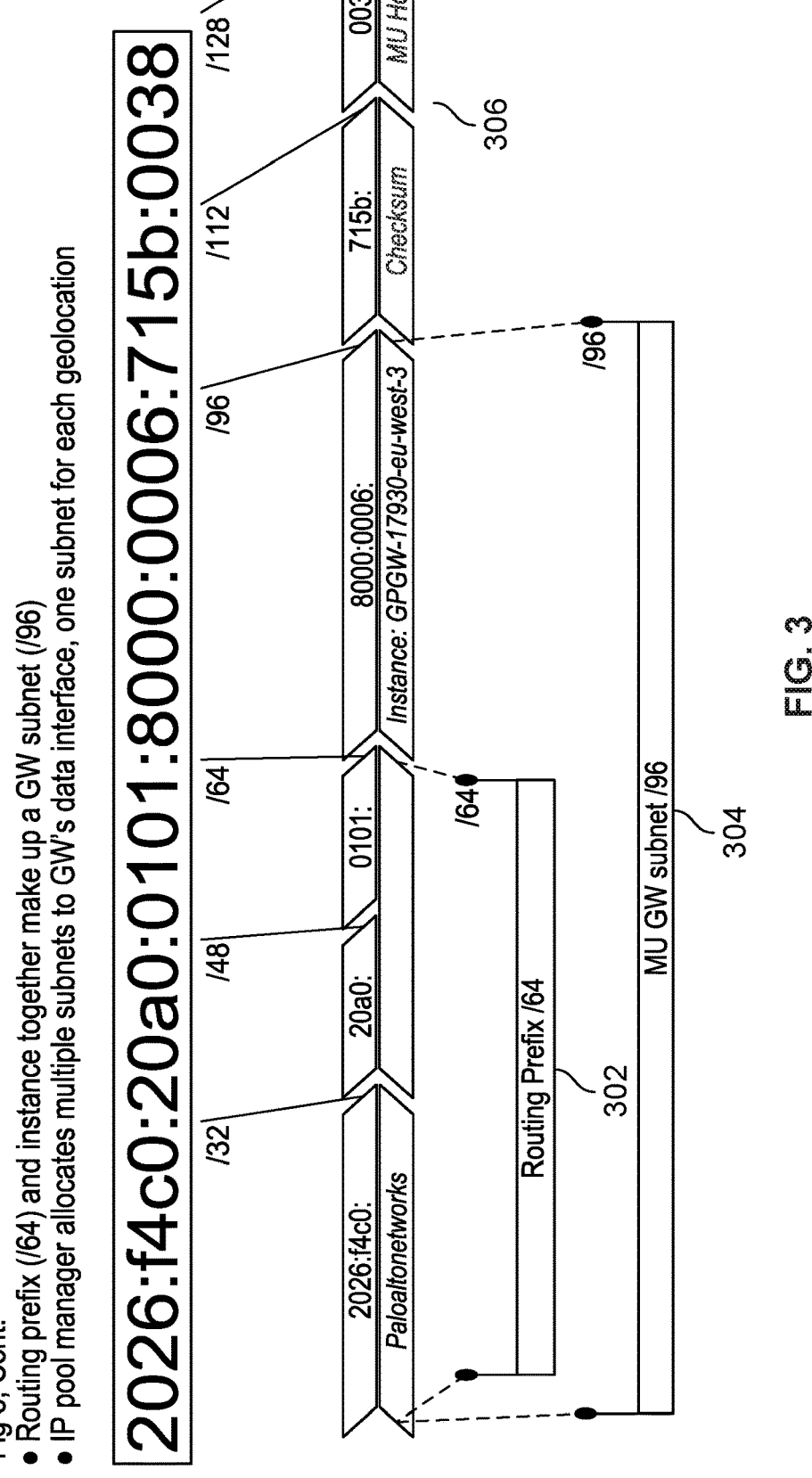
FIG. 3 illustrates another embodiment for structuring IPv6 addresses into bit fields to embed language localization and services information (e.g., and/or other attributes/information).

FIG. 3 illustrates another embodiment for structuring IPv6 addresses into bit fields to embed language localization and services information (e.g., and/or other attributes/information).

In this example implementation, the first 32 bits (or smaller) of the second half of 64 bits of the IPv6 address is used to identify virtual machine (VM) firewall instances, such as an MU instance "GPGW_17930_eu-west-3." The number of bits used for the instance can be various based on deployment, such as further described below. Routing prefix and the instance bits together make up a GW subnet, such as shown in FIG. 3. The bits after GW subnet until the end (e.g., bits 97-128) are used by the NPTv6 protocol for address translation.

As shown in FIG. 3, the initial 64 bits are used for the routing prefix (/64), as shown at 302.

As also shown in FIG. 3, the 32 bits between bits 64 and 96 are used to identify VM instances in the cloud (e.g., MU instance of "GPGW_17930_eu-west-3"), such as shown at 304.

As also shown in FIG. 3, the 32 bits between bits 96 and 128 are reserved for NPTv6 protocol for source NAT, such as shown at 306. In this example implementation, the routing prefix (/64) and instance together make up a GW subnet (/96). An IP pool manager can allocate multiple subnets to a GW's data interface, one subnet for each location.

For example, the above-described structuring of IPv6 addresses into bit fields to embed language localization and services information (e.g., and/or other attributes/information) can be effectively and efficiently applied to VPN MU worldwide deployments as well as to RN worldwide deployments, such as will be further described below.

As will now be apparent to one of ordinary skill in the art, variations of the structure and fields can be similarly implemented, such as variations of the cloud provider and the geolocation bits, such as cloud provider bits [33-34] and geolocation bits [35-44], and/or other variations, such as further described below.

FIG. 4 illustrates a table view of public IPv6 allocation for a client per geolocation in accordance with some embodiments.

Figure 5:
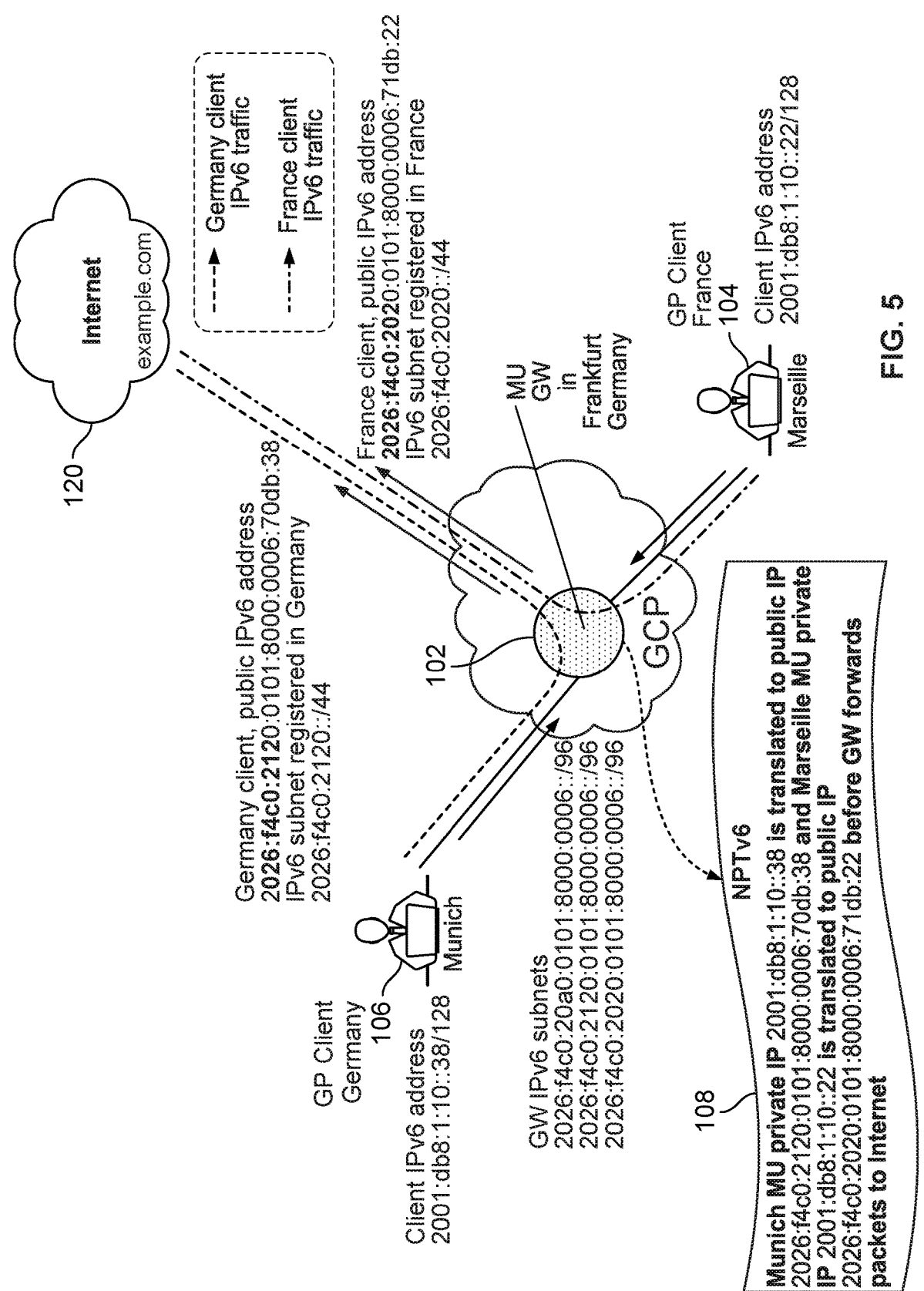
FIG. 5 illustrates a structuring of IPv6 addresses into bit fields to embed language localization and services information (e.g., and/or other attributes/information) to support MU language localization in accordance with some embodiments.

FIG. 5 illustrates a structuring of IPv6 addresses into bit fields to embed language localization and services information (e.g., and/or other attributes/information) to support MU language localization in accordance with some embodiments.

In this example diagram, the MU in both France and Germany, 104 and 106, respectively, connect to the Frankfurt MU GW 102 as shown in FIG. 5.

In this example implementation, the IP pool manager allocates multiple IPv6 subnets to the MU GW's data plane interface, one subnet for each geolocation.

Specifically, the GW public subnets are provided below.

2026:f4c0:20a0:0101:8000:0006::/96, Frankfurt, Germany

2026:f4c0:2120:0101:8000:0006::/96, Munich, Germany

2026:f4c0:2020:0101:8000:0006::/96, Marseille, France

As such, the geolocation signatures are then provided as shown below.

2026:f4c0:20a0::/44, Frankfurt, Germany

2026:f4c0:2120::/44, Munich, Germany

2026:f4c0:2020::/44, Marseille, France

In an example use case, a service provider (e.g., a security provider) can pre-allocate and register different IPv6 prefixes (/44) to different edge locations or countries and store it in geodatabase (e.g., via MaxMind). In this example, CIDR/44 is made up of purchased CIDR 2026:f4c0::/32, plus cloud provider bits, and geolocation bits as similarly described above with respect to FIG. 2. The IP pool manager allocates multiple IPv6 subnets (/96) to each GW's data interface, one for each geolocation, in effect, PA provides unique public IPv6 addresses for each customer. Each subnet (/96) contains a unique combination of the signatures of cloud provider, geolocation, tenant, and services.

In this example use case and as shown in FIG. 5, there are two geolocation prefixes (/44): one for Frankfurt, one for Munich, and one for Marseille. The three prefixes share the purchased CIDR 2026:f4c0::/32 and cloud provider signature (GCP), differ in geolocation bits value as provided below.

2026:f4c0:2120::/44, Munich, Germany
    2026:f4c0:2020::/44, Marseille, France
    2026:f4c0:20a0::/44, Frankfurt, Germany The IP manager creates routing prefix (/64) using the above geolocation prefixes (/44) plus tenant and services signatures as provided below.

2026:f4c0:2120:0101:/64
    2026:f4c0:2020:0101:/64
    2026:f4c0:20a0:0101:/64

The IP manager creates a GW subnet (/96) using the above routing prefix (/64) plus firewall instance as provided below.

2026:f4c0:2120:0101:8000:0006::/96, Munich, Germany
    2026:f4c0:2020:0101:8000:0006::/96, Marseille, France
    2026:f4c0:20a0: 0101:8000:0006::/96, Frankfurt, Germany The three subnets, differ in geolocation, and share the same signatures of cloud provider (e.g., GCP), tenant (e.g., ACME Corporation), service (e.g., MU), and firewall instance (e.g., GW Frankfurt).

When a GlobalProtect (GP) user connects to an MU GW and accesses a web site, before MU GW forwards the packets to Internet servers, the MU GW provides the public IPv6addresses for each user by NPTv6, which translates the private source IPv6 address in the user data packet to a public IPv6 address, choosing the subnet corresponding to the user's geolocation, such as provided below.

The Munich user public IP 2026:f4c0:2120:0101:8000:0006:70db:38 is created by using Munich subnet 2026:f4c0:2120:0101:8000:0006::/96.

The Marseille user public IP 2026:fc40: 2020:0101:8000:0006:71db:22 is created by using Marseille subnet 2026:f4c0:2020:0101:8000:0006::/96.

The Frankfurt user public IP 2026:fc40:20a0: 0101:8000:0006:7737:55 is created by using Frankfurt subnet 2026:f4c0:20a0:0101:8000:0006::/96.

As such, web sites can determine a packet's originating geolocation, by matching the geolocation signature of the source IP from a received packet to the signature in a geodatabase.

The Source IP 2026:f4c0:2120:0101:8000:0006:70db:38 bears Munich's geolocation signature 2026:f4c0:2120::/44.

The Source IP 2026:fc40:2020:0101:8000:0006:71db:22 bears Marseille's geolocation signature 2026:f4c0:2020::/44.

The Source IP 2026:fc40:20a0:0101:8000:0006:7737:55 bears Frankfurt's geolocation signature 2026:f4c0:20a0::/44.

Figure 6:
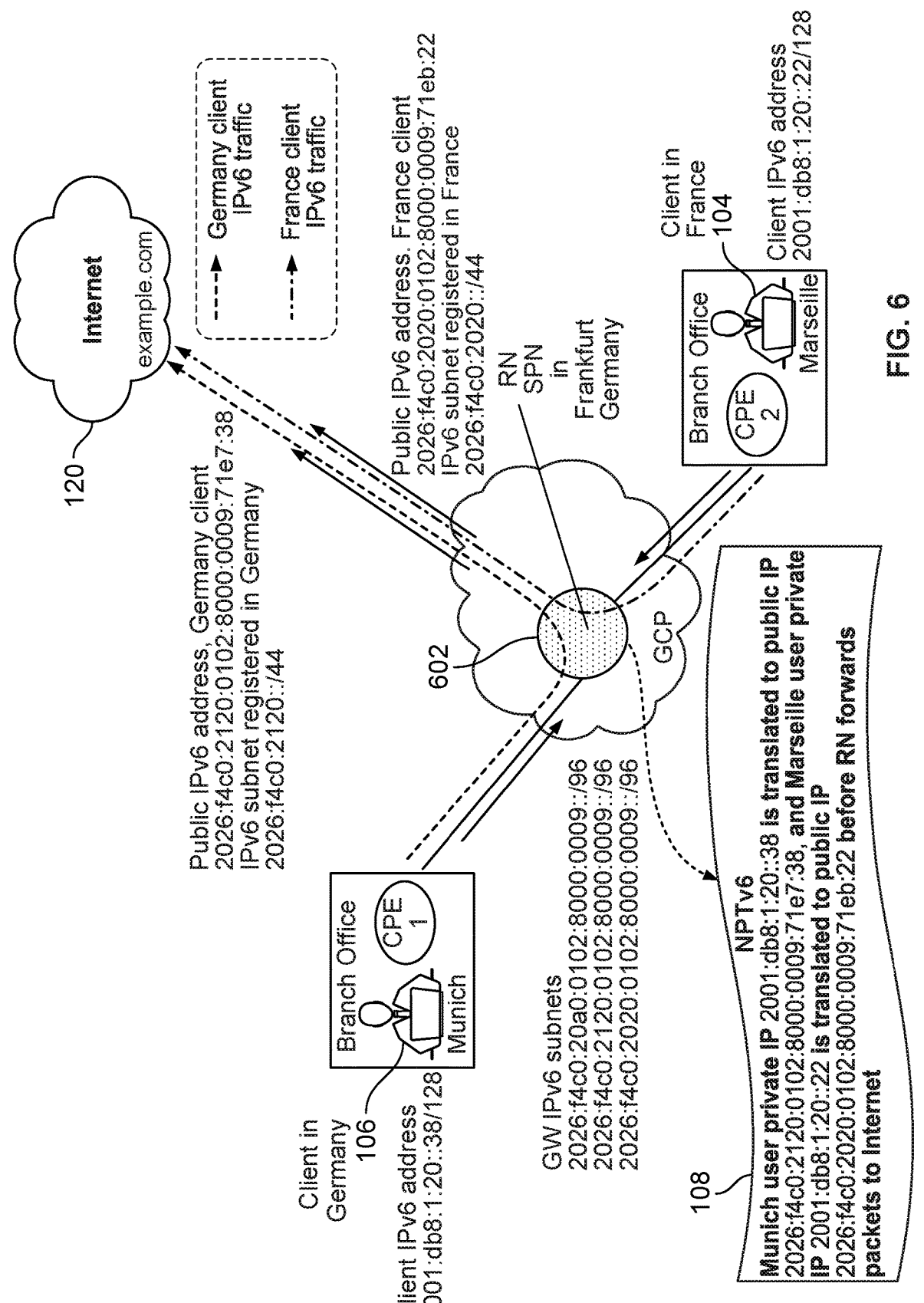
FIG. 6 illustrates a structuring of IPv6 addresses into bit fields to embed language localization and services information (e.g., and/or other attributes/information) to support RN language localization in accordance with some embodiments.

FIG. 6 illustrates a structuring of IPv6 addresses into bit fields to embed language localization and services information (e.g., and/or other attributes/information) to support RN language localization in accordance with some embodiments.

In this example diagram, both of the Branch office users in Marseille and Munich, 104 and 106, respectively, are connected to the Frankfurt RN-Security Processing Node (SPN) 602.

In this example implementation, the IP pool manager allocates multiple IPv6 subnets to the RN-SPN's data plane interface, one subnet for each geolocation.

Specifically, the RN public subnets are provided below.

2026:f4c0:2120:0102:8000:0009::/96, Munich, Germany
    2026:fc40:2020:0102:8000:0009::/96, Marseille, France
    2026:fc40:20a0:0102:8000:0009::/96, Frankfurt, Germany As such, the geolocation signatures are then provided as shown below.

2026:f4c0:2120::/44, Munich, Germany
    2026:fc40:2020::/44, Marseille, France
    2026:fc40:20a0::/44, Frankfurt, Germany As an example, the disclosed techniques for structuring of IPv6 addresses into bit fields to embed language localization and services information (e.g., and/or other attributes/information) can be effectively and efficiently applied to facilitate a web site displaying a proper language, and tailoring the content accordingly, based on the embedded geolocation information in the IPv6 address.

As another example, the disclosed techniques for structuring of IPv6 addresses into bit fields to embed language localization and services information (e.g., and/or other attributes/information) can be effectively and efficiently applied to determine a user's geolocation based on packet capture and extraction of the embedded geolocation information in the IPv6 address. Similarly, the cloud provider, tenant, service type, and/or firewall instance can similarly be determined based on packet capture and extraction of such embedded information in the IPv6 address.

FIG. 7 illustrates a table view of bits between 64 and 128, which can have variations depending on instance bits, in accordance with some embodiments.

As shown in the table of FIG. 7, the bits between 64 and 128 can have variations depending on instance bits. For example, three common use cases are shown in the table of FIG. 7 as will now be further described below.

Figure 8:
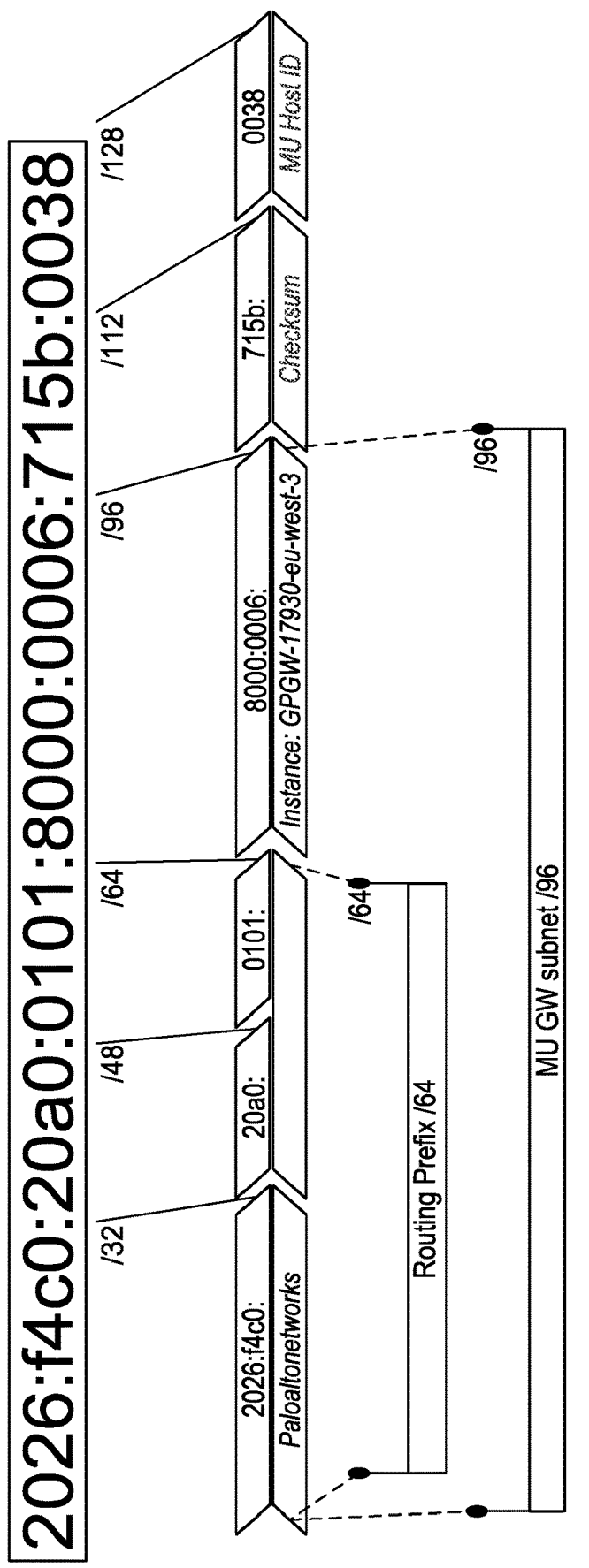
FIG. 8 illustrates another embodiment for structuring IPv6 addresses into bit fields to embed language localization and services information (e.g., and/or other attributes/information).

Referring to Case 1, which is also shown in FIG. 8, using GW subnet /96, the 32 bits between bits 64 and 96 are used to identify VM instances in the cloud (e.g., "GPGW_17936_us-east-1_conedistrib"). In this example use case, up to 4,294,967,296 unique cloud firewall instances can be supported by a service provider (e.g., a security provider).

Figure 9:
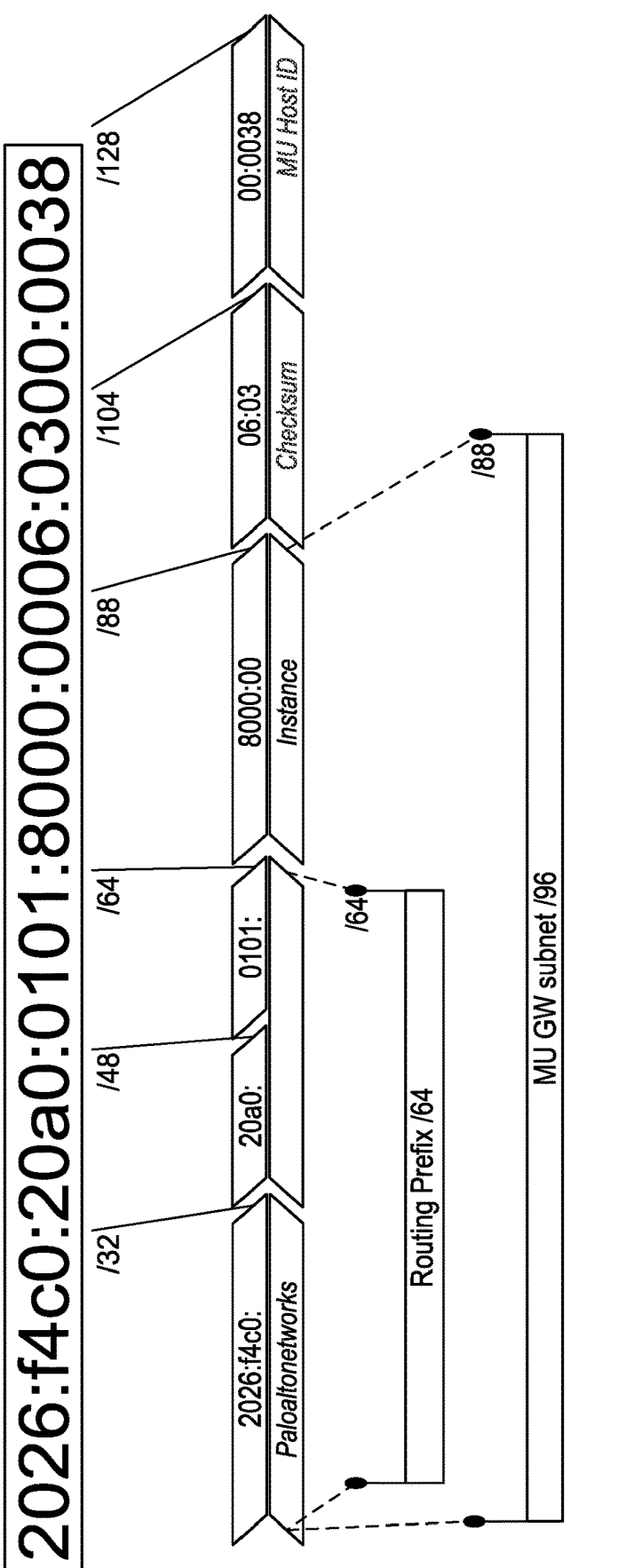
FIG. 9 illustrates another embodiment for structuring IPv6 addresses into bit fields to embed language localization and services information (e.g., and/or other attributes/information).

The 32 bits between bits 96 and 128 are reserved for MU IP pool and NPTv6 protocol. Each MU GW allocates a /112 for MU IP pool. The 16 bits between 112 and 128 are used for the host ID. Each GW can provide 65,536 unique host addresses. The 16 bits between 96 and 112 are used for checksum, which is computed by NPTv6 during address translation Referring to Case 2, which is also shown in FIG. 9, using GW subnet /88, the 24 bits between bits 64 and 88 are used to identify VM instances in the cloud (e.g., "GPGW_17936_us-east-1_conedistrib"). In this example use case, up to 16,777,216 unique cloud firewall instances can be supported by a service provider (e.g., a security provider).

The 40 bits between bits 88 and 128 are reserved for MU IP pool and NPTv6 protocol. Each MU GW allocates/104 for MU IP pool. The 24 bits between bits 104 and 128 are used for the host ID. Each MU GW can provide 16,777,216 unique host addresses. The 24 bits between bits 88 and 104 are used for checksum, which is computed by NPTv6 during address translation.

Figure 10:
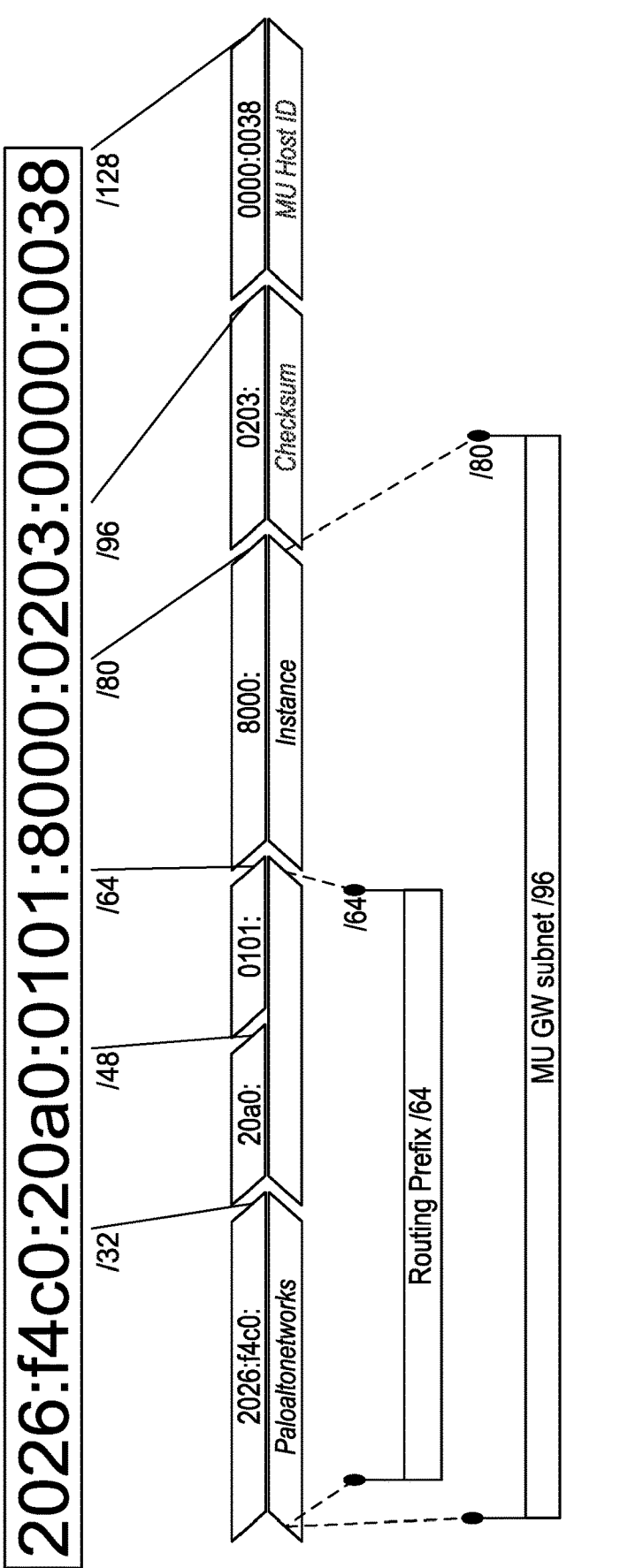
FIG. 10 illustrates another embodiment for structuring IPv6 addresses into bit fields to embed language localization and services information (e.g., and/or other attributes/information).

Referring to Case 3, which is also shown in FIG. 10, using GW subnet /80, the 16 bits between bits 64 and 80 are used to identify VM instances in the cloud (e.g., "GPGW_17936_us-east-1_conedistrib"). In this example use case, up to 65,536 unique cloud firewall instances can be supported by a service provider (e.g., a security provider).

The 48 bits between bits 80 and 128 are reserved for MU IP pool and NPTv6 protocol. Each MU GW allocates /96 for MU IP pool. The 32 bits between bits 96 and 128 are used for the host ID. Each GW can provide 4,294,967,296 unique host addresses. The 16 bits between bits 80 and 96 are used for checksum, which is computed by NPTv6 during address translation.

FIG. 8 illustrates another embodiment for structuring IPv6 addresses into bit fields to embed language localization and services information (e.g., and/or other attributes/information). Specifically, this example corresponds to use case 1 as described above for a structured IPv6 address: GW subnet /96 (e.g., instance of 32 bits).

FIG. 9 illustrates another embodiment for structuring IPv6 addresses into bit fields to embed language localization and services information (e.g., and/or other attributes/information). Specifically, this example corresponds to use case 2 as described above for a structured IPv6address: GW subnet /88 (e.g., instance of 24 bits).

FIG. 10 illustrates another embodiment for structuring IPv6 addresses into bit fields to embed language localization and services information (e.g., and/or other attributes/information). Specifically, this example corresponds to use case 3 as described above for a structured IPv6 address: GW subnet/80 (e.g., instance of 16 bits).

Various process embodiments for structuring IPv6 addresses into bit fields to embed language localization and services information (e.g., and/or other attributes/information) will now be further described below.

Figure 11:
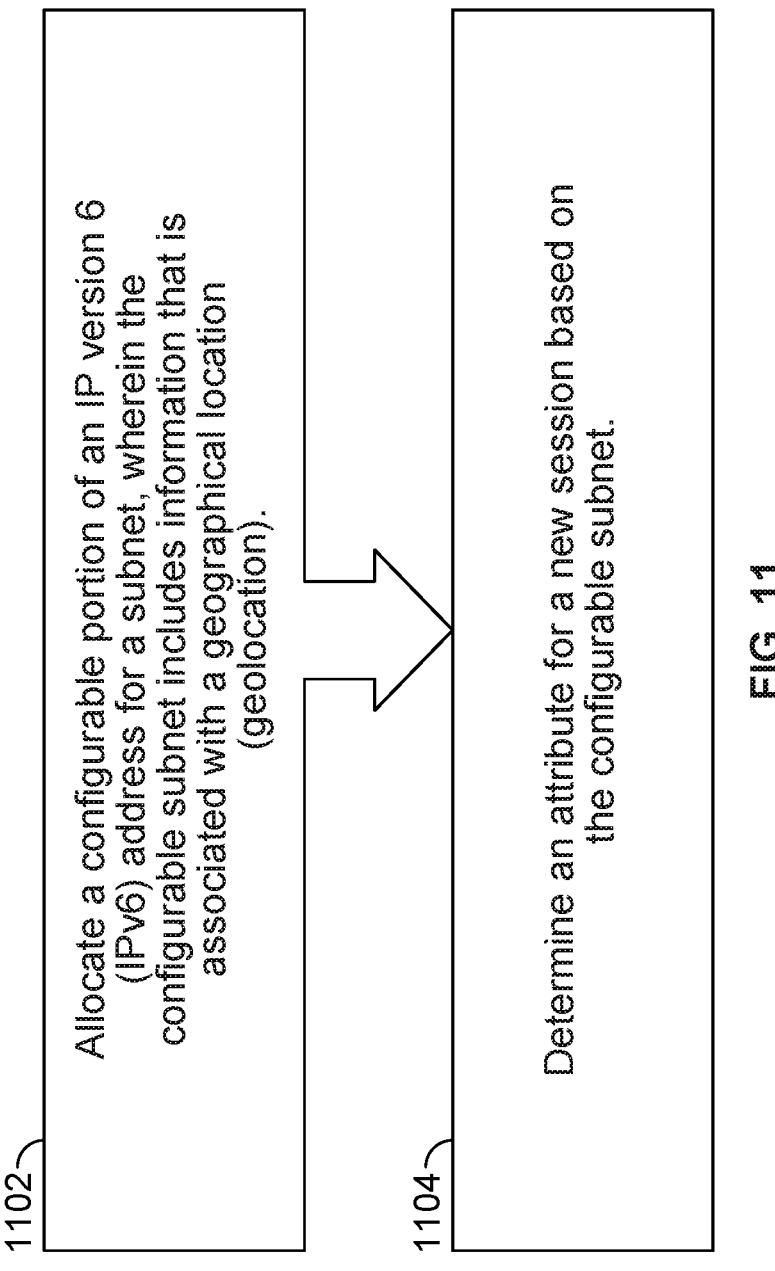
FIG. 11 is a flow diagram for structuring IPv6 addresses into bit fields to embed language localization and services information (e.g., and/or other attributes/information) in accordance with some embodiments.

Example Process Embodiments for Stucturing IPv6 Addresses into Bit Fields to Embed Language Localization and Services Information FIG. 11 is a flow diagram for structuring IPv6 addresses into bit fields to embed language localization and services information (e.g., and/or other attributes/information) in accordance with some embodiments. In some embodiments, a process as shown in FIG. 11 is performed by a networking device (e.g., a GW, RN, etc.), and techniques as similarly described above including the embodiments described above with respect to FIGS. 2-10.

At 1102, allocating a configurable portion of an IP version 6 (IPv6) address for a subnet is performed at a security platform, wherein the subnet includes information that is associated with a geographical location (geolocation), such as similarly described above with respect to FIGS. 2-10.

At 1104, determining an attribute for a new session based on the subnet is performed at a security platform, such as similarly described above with respect to FIGS. 2-10.

FIG. 12 is a flow diagram for structuring IPv6 addresses into bit fields to embed language localization and services information (e.g., and/or other attributes/information) in accordance with some embodiments. In some embodiments, a process as shown in FIG. 12 is performed by a networking device (e.g., a GW, RN, etc.), and techniques as similarly described above including the embodiments described above with respect to FIGS. 2-10.

At 1202, allocating a configurable portion of an IP version 6 (IPv6) address for a subnet is performed at a security platform, wherein the subnet includes information that is associated with a geographical location (geolocation), such as similarly described above with respect to FIGS. 2-10.

At 1204, determining an attribute for a new session based on the subnet is performed at a security platform, such as similarly described above with respect to FIGS. 2-10.

At 1206, displaying a proper language to a user based on the determined attribute that includes the geolocation is performed at a security platform, such as similarly described above with respect to FIGS. 2-10.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
    a processor configured to:
        allocate a configurable portion of an IP version 6 (IPv6) address for a subnet, wherein the subnet includes information that is associated with a geographical location (geolocation); and
        determine an attribute for a new session based on the subnet, wherein the subnet is of a variable size that is used for configurable attribute information; and
    a memory coupled to the processor and configured to provide the processor with instructions.

2. The system of claim 1, wherein the configurable portion of the IPV6 address further includes tenant information.

3. The system of claim 1, wherein the configurable portion of the IPV6 address further includes service type information.

4. The system of claim 1, wherein the configurable portion of the IPV6 address further includes service type information to self-identify associated network traffic with a service type.

5. The system of claim 1, wherein the configurable portion of the IPV6 address further includes service type information to self-identify associated network traffic with a service type that includes one or more of the following: mobile user (MU), remote node (RN), proxy, and/or another service type.

6. The system of claim 1, wherein determining the attribute for the new session based on the subnet is applied to enable a Software as a Service (SaaS) provider to tailor content based on incoming connection's source IP, enhancing end user experiences.

7. The system of claim 1, wherein determining the attribute for the new session based on the subnet is applied to enable a service provider to tailor content based on a user's geolocation.

8. The system of claim 1, wherein determining the attribute for the new session based on the subnet is applied to enable a web site to display a proper language based on the IPV6 address without requiring an extra header to support language translation.

9. The system of claim 1, wherein determining the attribute for the new session based on the subnet is applied to enable associated network traffic to self-identify its originating cloud.

10. The system of claim 1, wherein determining the attribute for the new session based on the subnet is applied to enable associated network traffic to self-identify its originating Secure Access Service Edge (SASE).

11. The system of claim 1, further comprising to:

display a proper language to a user based on the determined attribute that includes the geolocation.

12. A method, comprising:

allocating a configurable portion of an IP version 6 (IPv6) address for a subnet, wherein the subnet includes information that is associated with a geographical location (geolocation); and determining an attribute for a new session based on the subnet, wherein the subnet is of a variable size that is used for configurable attribute information.

13. The method of claim 12, wherein the configurable portion of the IPV6 address further includes tenant information.

14. The method of claim 12, wherein the configurable portion of the IPV6 address further includes service type information.

15. The method of claim 12, wherein the configurable portion of the IPV6 address further includes service type information to self-identify associated network traffic with a service type that includes one or more of the following: mobile user (MU), remote node (RN), proxy, and/or another service type.

16. The method of claim 12, wherein determining the attribute for the new session based on the subnet is applied to enable a Software as a Service (SaaS) provider to tailor content based on incoming connection's source IP, enhancing end user experiences.

17. The method of claim 12, wherein determining the attribute for the new session based on the subnet is applied to enable a service provider to tailor content based on a user's geolocation.

18. The method of claim 12, wherein determining the attribute for the new session based on the subnet is applied to enable a web site to display a proper language based on the IPv6 address without requiring an extra header to support language translation.

19. The method of claim 12, wherein determining the attribute for the new session based on the subnet is applied to enable associated network traffic to self-identify its originating cloud.

20. The method of claim 12, wherein determining the attribute for the new session based on the subnet is applied to enable associated network traffic to self-identify its originating Secure Access Service Edge (SASE).

21. The method of claim 12, further comprising displaying a proper language to a user based on the determined attribute that includes the geolocation.

22. A computer program product embodied in a non-transitory computer readable medium and comprising computer instructions for:

allocating a configurable portion of an IP version 6 (IPv6) address for a subnet, wherein the subnet includes information that is associated with a geographical location (geolocation); and determining an attribute for a new session based on the subnet, wherein the subnet is of a variable size that is used for configurable attribute information.

23. The computer program product of claim 22, wherein the configurable portion of the IPV6 address further includes tenant information.

24. The computer program product of claim 22, wherein the configurable portion of the IPV6 address further includes service type information.

25. The computer program product of claim 22, wherein the configurable portion of the IPV6 address further includes service type information to self-identify associated network traffic with a service type that includes one or more of the following: mobile user (MU), remote node (RN), proxy, and/or another service type.

26. The computer program product of claim 22, wherein determining the attribute for the new session based on the subnet is applied to enable associated network traffic to self-identify its originating Secure Access Service Edge (SASE).

* * * * *